US006823364B1

(12) United States Patent
Sollee et al.

(10) Patent No.: US 6,823,364 B1
(45) Date of Patent: Nov. 23, 2004

(54) DISTRIBUTION OF LOCATION INFORMATION IN IP NETWORKS BY INTELLIGENT ENDPOINTS

(75) Inventors: Pat Sollee, Richardson, TX (US); Christopher Jessen, McKinney, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/468,977

(22) Filed: Dec. 21, 1999

(51) Int. Cl.[7] .............................................. G06F 15/16
(52) U.S. Cl. ...................... 709/205; 709/204; 709/207; 709/223; 709/227; 709/230; 709/249; 709/250; 709/251; 709/252
(58) Field of Search ................................ 709/204, 205, 709/207, 223, 230, 250, 249, 251, 252, 106

(56) References Cited

U.S. PATENT DOCUMENTS

| | | | |
|---|---|---|---|
| 5,796,934 A | * | 8/1998 | Bhanot et al. |
| 5,889,945 A | * | 3/1999 | Porter et al. |
| 6,078,954 A | * | 6/2000 | Lakey et al. |
| 6,085,244 A | * | 7/2000 | Wookey |
| 6,163,799 A | * | 12/2000 | Kambayashi et al. |
| 6,195,689 B1 | * | 2/2001 | Bahlmann |
| 6,240,451 B1 | * | 5/2001 | Campbell et al. |
| 6,243,749 B1 | * | 6/2001 | Sitaraman et al. |
| 6,256,750 B1 | * | 7/2001 | Takeda |
| 6,260,148 B1 | * | 7/2001 | Aggarwal et al. |
| 6,347,333 B2 | * | 2/2002 | Eisendrath et al. |
| 6,418,462 B1 | * | 7/2002 | Xu |
| 6,446,116 B1 | * | 9/2002 | Burridge |

FOREIGN PATENT DOCUMENTS

| WO | WO 98/16045 | 4/1998 |
|---|---|---|

OTHER PUBLICATIONS www.cs.columbia.edu/~hgs/sip/sip.html; Session Initiation Protocol (SIP).
Muller, Nathan; "Dial 1–800–Internet With New Software, You Can Talk Business Over the Net and Avoid Long–Distance Charges"; Byte, US, McGraw–Hill, Inc. St. Peterborough, vol. 21, No. 2; Feb. 1, 1996; pp. 83–84, 86, 88.
Toga, James; "ITU–T Standardization Activities for Interactive Multimedia Communications on Packet–Based Networks; H.323 and Related Recommendations"; Computer Networks and ISDN Systems, North Holland Publishing Amsterdam, NL, vol. 31, No. 3; Feb. 11, 1999; pp. 205–223.

* cited by examiner

*Primary Examiner*—Hosain Alam
*Assistant Examiner*—Michael Y. Won
(74) *Attorney, Agent, or Firm*—Haynes and Boone, LLP

(57) ABSTRACT

A distribution of location information in IP networks by intelligent endpoints is presented. The network comprises an intelligent endpoint operably coupled to a plurality of clients. A first one of the clients registers with the intelligent endpoint that stores location information of the first client. A second one of the clients may also register with the intelligent endpoint that stores the location information of the second client. The intelligent endpoint automatically presents the location information of the first client to the second client and of the second client to the first client. The first client can then directly communicate with the second client. Either client can also be an intelligent endpoint.

33 Claims, 2 Drawing Sheets

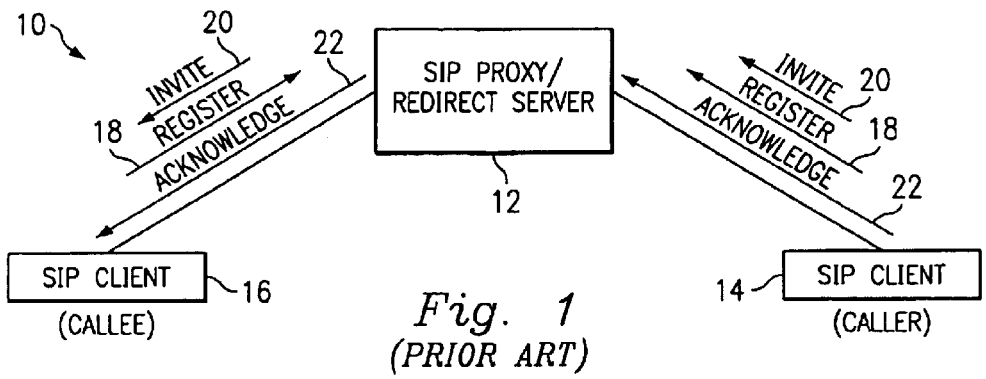
Fig. 1
(PRIOR ART)
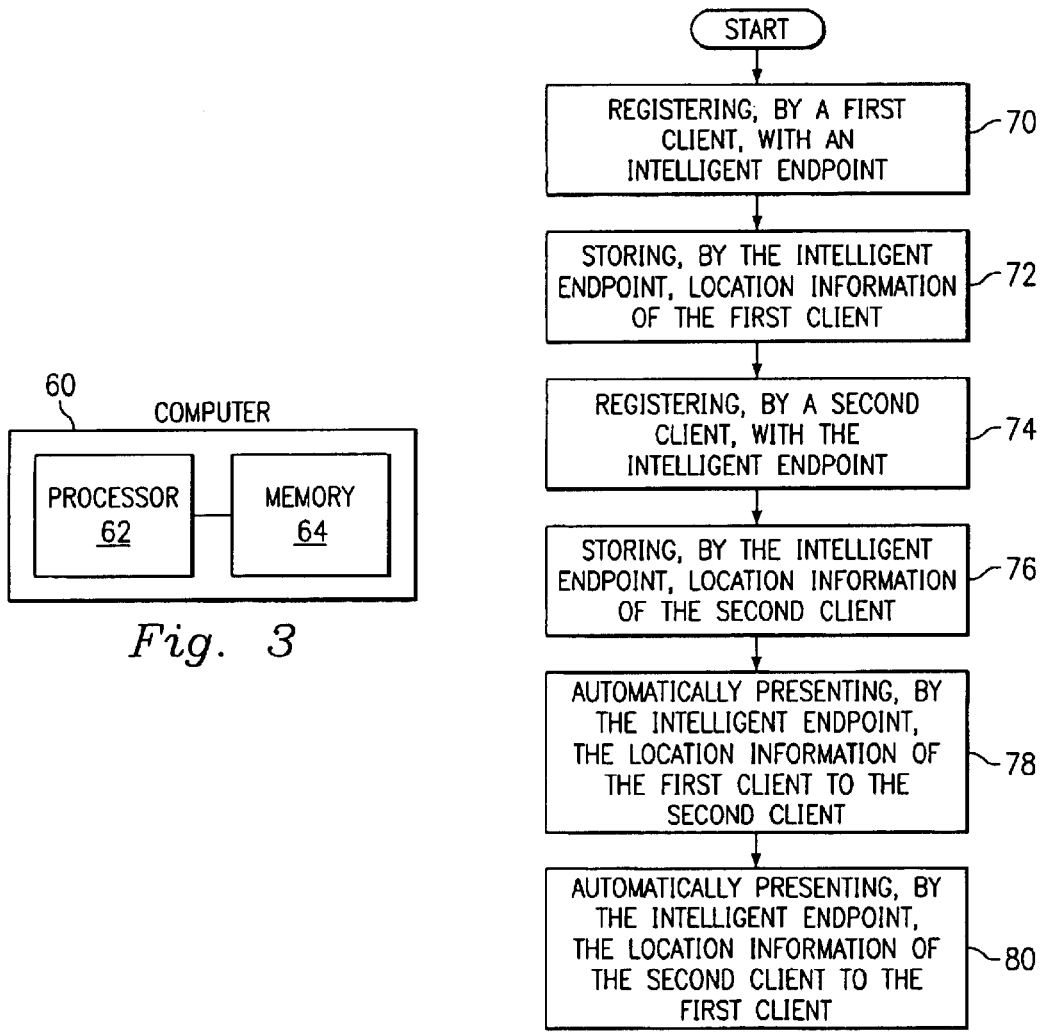
Fig. 3
Fig. 4

US 6,823,364 B1

DISTRIBUTION OF LOCATION INFORMATION IN IP NETWORKS BY INTELLIGENT ENDPOINTS

BACKGROUND

This application relates generally to distribution of location information in Internet Protocol (IP) networks and, more particularly, to distribution of location information in IP networks by intelligent endpoints.

With the location information, such as an IP address and/or name of a user, a client (or computer) may communicate with another client in the IP network. Such communication includes data, voice, and multi-media applications.

A conventional method for distributing location information in an IP network has been disclosed by the Internet Engineering Task Force (IETF) standards group with their Session Initiation Protocol (SIP). FIG. 1 depicts an IP network 10 that utilizes the SIP. The network 10 includes a SIP Proxy/Redirect Server 12 that receives and transmits messages between the SIP client's 14 (for example, the caller) and 16 (for example, the callee). The caller 14 and the callee 16 are identified by their respective SIP addresses which are similar to an email address such as caller@host.com. In addition to the caller's 14 name, the caller's 14 telephone number could also be sent as callersnumber@ghost.com. The domain name ("host") can be a domain name or a numeric network address.

Before making a call, both the caller 14 and the callee 16 must Register 18 with the server 12. After registering and receiving an Acknowledge (not shown), the caller 14 can make a SIP call. To do so, the caller (SIP client) 14 sends an Invite 20 to the callee 16 via the server 12. The Invite 20 asks the callee 16 to join in a communication session, such as a Voice over IP (VoIP) call, with the caller 14. The Invite 20 usually contains a session description that contains enough information for the callee 16 to join the communication. For multicast sessions, the session description numbers the types of media and formats that are permitted in the communication session. For unicast sessions, the session description numbers the types of media and formats that the caller 14 is willing to use and to what location the information should be sent. If the callee 16 agrees to join the communication, the caller 14 is alerted by receiving, from the callee 16, a similar description of the types of media and formats (in the case of a unicast transmission) that the callee 16 is willing to use. The caller 14 then confirms to the callee 16, via an Acknowledge (or Ack) message 22, that it 14 has received the callee's 16 confirmation. If the callee 16 wishes to end the communication, a Bye message (not shown) is sent to the caller 14.

There are certain limitations associated with this conventional method of distributing location information. For example, the caller 14 does not know if the callee 16 is available for the communication session. As such, network 10 time and capacity are constrained as messages are sent via the server 12 to initiate contact with a callee that may not be available. Further, the IP address of the callee 16 is not initially known by the caller 14 and thus degrades the network's 10 efficiency because of the messaging required to initiate a communication session. Additionally, the potential callers and callees do not receive an automatic update when a new client is available or unavailable for contact. Also, ownership, capacity, and privacy issues exist. The ownership issue deals with the responsibility for ensuring that the server 12 is functioning properly. If the server 12 goes "down," the users may not know the reason for the downed server or who to contact to get an update. The capacity issue deals with the fact that existing servers are free and thus often overloaded making communication difficult. The privacy issue deals with the fact that all users may "see" all other registered users and that the owner (or operator) of the server 12 can track users calls because they are being transported via the server 12.

In order to make an IP based call, the IP address of the called party must be known or determined before the call can be made. Today, users which dial into Internet Service Providers are allocated a different IP address each time they log in. Therefore, a method and network (such as an IP network) for distribution of location information, where a user (or username) is mapped to an IP address, that reduces or eliminates these limitations and inefficiencies is desired.

SUMMARY

In response to these and other limitations, provided herein is a unique system and method for distributing location information in IP networks by intelligent endpoints.

The system (or IP network) of the present invention comprises an intelligent endpoint operably coupled to a plurality of clients. In one embodiment, a first one of the clients registers with the intelligent endpoint that stores location information of the first client. A second one of the clients may also register with the intelligent endpoint that stores the location information of the second client. The intelligent endpoint automatically presents the location information of the first client to the second client and of the second client to the first client.

In some embodiments the first client directly communicates with the second client.

In some embodiments the location information comprises the clients IP address.

In some embodiments the location information comprises a user's name, wherein the user is associated with one of the clients.

In some embodiments the intelligent endpoint comprises a static IP address.

In some embodiments the intelligent endpoint is associated with an area of interest.

In some embodiments the intelligent endpoint is associated with a plurality of areas of interest.

In some embodiments the intelligent endpoint registers with a second intelligent endpoint, where the second intelligent endpoint is associated with a second area of interest.

In some embodiments a plurality of clients register with a plurality of endpoints, where the registration includes each client's (or user's) areas of interest.

In some embodiments a private group of clients registers with the intelligent endpoint.

In some embodiments the first client de-registers with the intelligent endpoint which deletes the location information of the first client and automatically removes the location information of the first client with the second client.

These advantages, as well as others which will become apparent, are described in greater detail with respect to the drawings and the following disclosure.

BRIEF DESCRIPTION OF THE DRAWINGS

FIG. 1 is a diagrammatic view of a prior art communication system for distributing location information.

FIG. 3 is a computer of the present invention.

FIG. 4 is a flow chart of a method for distributing location information in an Internet Protocol network of the present invention.

DETAILED DESCRIPTION

Figure 2:
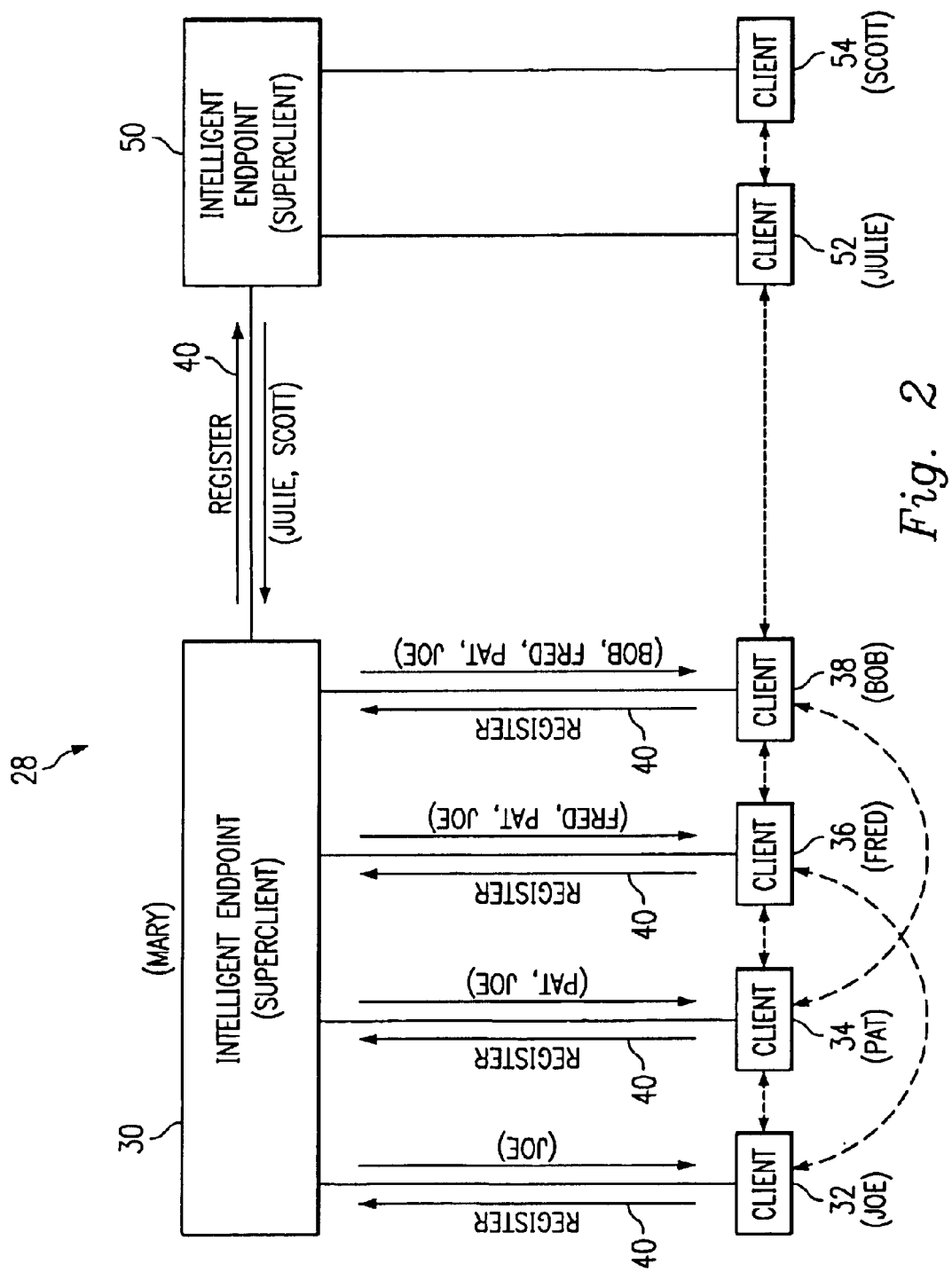
FIG. 2 is a diagrammatic view of a communication system of the present invention for distributing location information.

FIG. 2 depicts an Internet Protocol (IP) network 28 of the present invention. The network 28 includes an intelligent endpoint (or super client) 30 that is operably coupled to a plurality of clients 32–38. The intelligent endpoint 30, which may be SIP based (i.e. an extension of SIP) comprises a static IP address and includes an always available IP connection (via, for example, a cable modem or Digital Subscriber Line). The user of the intelligent endpoint 30 provides its IP address to the plurality of clients 32–38. If client 32 (Joe) decides to go on-line, he registers, via a Register message 40 with the intelligent endpoint 30 that stores the location information of the client 32. The Register message 40 includes the location information (such as an IP address or user's name—where the user is associated with one of the clients) of the client 32. After the client 32 has registered, it 32 receives a message from the intelligent endpoint 30 indicating that it is the only client registered thus far. As such, Joe may want to initiate a communication with Mary.

If client 34 (Pat) then registers, its 34 location information is stored with the intelligent endpoint 30. The intelligent endpoint 30 then automatically sends a message to the client 34 indicating (or presenting) to Pat that Joe is also on-line and provides the client's 32 location information. Similarly, the intelligent endpoint 30 automatically sends a message to the client 32 indicating to Joe that Pat is on-line and provides the client's 34 location information. The clients location information may be presented via a "pop-up" window, such as a Graphical User Interface, that can be accessed (for example, "double clicked") to initiate a communication session. The communication may be, for example, a VoIP call, a multi-media conference, or a "text chat" call. Either client 32, 34 may now directly communicate with the other (or with the intelligent endpoint 30).

As each additional client 36, 38 registers with the intelligent endpoint 30, they 36, 38, as well as the clients 32, 34, are updated with each others location information and thus their users (Joe, Pat, Fred, and Bob) can easily communicate with one another. As such, after the clients have registered with the intelligent endpoint 30, no messaging must traverse the intelligent endpoint 30 for communication between the clients.

If a client wishes to go off-line (or de-register) a Register message, with a time out value of zero (not shown), is sent to the intelligent endpoint 30. The intelligent endpoint 30 deletes the location information of the client and automatically removes that information from the remaining clients' pop-up window (for example) that are still on-line. Thus, the remaining clients are immediately updated of this fact and know to not attempt a communication with the departed client.

Intelligent endpoints of the present invention are associated with an area of interest (or group). For example, the intelligent endpoint 30 may be associated with the "Dallas Cowboys" area of interest. The users are probably interested in communicating with other Dallas Cowboy fans and thus register with the intelligent endpoint 30. The intelligent endpoint 30 may also be associated with many areas of interest (or groups) and may register (by sending its IP address) with another intelligent endpoint 50 that is associated with another area of interest, such as "High-Tech Stocks." The clients 52, 54 of the intelligent endpoint 50 may communicate with one another in a similar manner as described above. Additionally, the clients 52, 54 may register with the intelligent endpoint 30 and communicate with clients 32–38. As such, Julie may communicate directly with Bob.

In addition to including a client's location information, each registration message may also include a client's (or user's) areas of interest. As such, if an intelligent endpoint registers with another intelligent endpoint that includes an area of interest specified by a user, that user's client will be alerted to that fact allowing the user to communicate with other users who have the same interest. Additionally, users may set up private groups by only allowing pre-defined users' clients to register with an intelligent endpoint.

Any of the clients 32–38, 52, 54 may become intelligent endpoints if they can provide a static IP address and an always available IP connection. As such, Pat may decide to start a new group and could alert others that his client 34 is now an intelligent endpoint for a new area of interest. Those clients who are interested in the new area, may register with Pat's client 34 and communicate with one another in a similar manner as described above. As this communication is occurring, Pat may simultaneously communicate with other clients and/or other intelligent endpoints.

FIG. 3 depicts a computer 60 (which contains a computer program) that comprises a processor 62 and memory 64. The computer 60 may be a personal computer or laptop, the clients 32–38, 52–54, the intelligent endpoints 30, 50, and/or any device that can send and receive IP information. The processor 62 may be a central processing unit, digital signal processor, microprocessor, microcontroller, microcomputer, and/or any device that manipulates digital information based on programming instructions. The memory 64 may be read-only memory, random access memory, flash memory and/or any device that stores digital information. The memory 64 is coupled to the processor 62 and stores programming instructions (the computer program) that, when read by the processor 62, cause the processor to perform certain processing operations.

FIG. 4 depicts a method for distributing location information in an IP network that may be implemented by the computers described above. The method begins at step 70 where a first client registers with an intelligent endpoint that stores, at step 72, location information of the first client. At step 74, a second client registers with the intelligent endpoint that stores, at step 76, location information of the second client. The method proceeds to step 78 where the intelligent endpoint automatically presents the location information of the first client to the second client and, at step 80, automatically presents the location information of the second client to the first client.

The present invention thus enjoys several advantages. For example, an intelligent endpoint is described that efficiently and effectively distributes location information, which includes a client's IP address and/or a user name, across an IP network. Additionally, a user may specify, to the intelligent endpoint, the groups or area's he/she is interested in. Also, the ownership, capacity and privacy issues of the prior art are addressed because the intelligent endpoint contact is known to the users, the size of the groups are generally small, and the users only "see" other registered users in the same intelligent endpoint and/or in another intelligent endpoint registered with the same intelligent endpoint. Further, the improvements of the present invention may be applied to and used with the SIP, SIP Proxy/Redirect Server, and the SIP clients.

It is understood that variations may be made in the foregoing without departing from the scope of the present invention. For example, any number and combination of entities such the clients 32–38, 52–54, the intelligent endpoints 30, 50, and the computer 60, may comprise or be used with the present network 28. Also, the network 28 may be connected to another wireless, wireline, data, voice, and/or multi-media network. Further, other parameters may be included in the Register message 40 that provides the intelligent endpoint 30 with additional information. For example, a parameter may inform the intelligent endpoint 30 that a client is an intelligent endpoint enabled client and thus has certain privileges and rights.

It is further understood that other modifications, changes and substitutions are intended in the foregoing disclosure and in some instances some features of the disclosure will be employed without corresponding use of other features. Additionally, singular discussion of items and/or computers located in the network 28 is also meant to apply to situations where a plurality of items and/or computers exist. Accordingly, it is appropriate that the appended claims be construed broadly and in a manner consistent with the scope of the disclosure.

What is claimed is:

1. A method for distributing location information in an Internet Protocol (IP) network that comprises a first intelligent endpoint operably coupled to clients, wherein the first intelligent endpoint is a networked computer that satisfies a predefined set of criteria to qualify as an intelligent endpoint for distributing location information from any client to any other client or another intelligent endpoint in a network, wherein the predefined set of criteria require that each intelligent endpoint be Session Initiation Protocol (SIP) based, and have a static IP address and an always available IP connection, the method comprising:

registering, by a first one of the clients, with the first intelligent endpoint wherein the registering facilitates communications between the first one of the clients with other clients;

storing, by the first intelligent endpoint, the location information of the first client;

registering, by a second one of the clients, with the first intelligent endpoint;

storing, by the first intelligent endpoint, the location information of the second client;

automatically presenting, by the first intelligent endpoint, the location information of the first client to the second client;

automatically presenting, by the first intelligent endpoint, the location information of the second client to the first client;

designating the first client as a second intelligent endpoint; and informing the second client that the first client is the second intelligent endpoint, wherein the second client can be simultaneously served by both the first and second intelligent endpoints.

2. The method of claim 1 further comprising directly communicating, by the first client, with the second client.

3. The method of claim 1, wherein the location information comprises the clients IP address.

4. The method of claim 1, wherein the location information comprises a user's name, wherein the user is associated with one of the clients.

5. The method of claim 1, wherein the first intelligent endpoint is associated with an area of interest.

6. The method of claim 1, wherein the first intelligent endpoint is associated with a plurality of areas of interest.

7. The method of claim 1 further comprising registering by the first intelligent endpoint with the second intelligent endpoint, wherein the second intelligent endpoint is associated with a second area of interest.

8. The method of claim 1 further comprising registering, by a plurality of clients, with a plurality of intelligent endpoints, wherein the registration includes each client's areas of interest.

9. The method of claim 1 further comprising registering, by a private group of clients, with the first intelligent endpoint.

10. The method of claim 1 further comprising:

de-registering, by the first client, with the first intelligent endpoint;

deleting, by the first intelligent endpoint, the location information of the first client; and automatically removing, by the first intelligent endpoint, the location information of the first client with the second client.

11. A system for distributing location information in an Internet Protocol (IP) network that comprises a first Session Initiation Protocol (SIP) based intelligent endpoint operably coupled to clients, wherein the first intelligent endpoint is a networked computer that satisfies a predefined set of criteria to qualify as an intelligent endpoint for distributing location information from any client to any other client or another intelligent endpoint in a network, wherein the predefined set of criteria require that each intelligent endpoint have a static IP address and an always available IP connection, the system comprising:

means for registering, by a first one of the clients, with the first intelligent endpoint;

means for storing, by the first intelligent endpoint, the location information of the first client;

means for registering, by a second one of the clients, with the first intelligent endpoint;

means for storing, by the first intelligent endpoint, the location information of the second client;

means for automatically presenting, by the first intelligent endpoint, the location information of the first client to the second client; and means for automatically presenting, by the first intelligent endpoint, the location information of the second client to the first client;

means for designating the first client as a second intelligent endpoint; and means for informing the second client that the first client is the second intelligent endpoint, wherein the first and second intelligent endpoints are simultaneously accessible to the second client.

12. The system of claim 11, further comprises means for directly communicating, by the first client, with the second client.

13. The system of claim 11, wherein the location information comprises the clients IP address.

14. The system of claim 11, wherein the location information comprises a user's name, wherein the user is associated with one of the clients.

15. The system of claim 11, wherein the first intelligent endpoint is associated with an area of interest.

16. The system of claim 11, wherein the first intelligent endpoint is associated with a plurality of areas of interest.

17. The system of claim 11 further comprises means for registering by the first intelligent endpoint with the second intelligent endpoint, wherein the second intelligent endpoint is associated with a second area of interest.

18. The system of claim 11 further comprises means for registering, by a plurality of clients, with a plurality of endpoints, wherein the registration includes each client's areas of interest.

19. The system of claim 11 further comprises means for registering, by a private group of clients, with the first intelligent endpoint.

20. The system of claim 11 further comprises:
   means for de-registering, by the first client, with the first intelligent endpoint;
   means for deleting, by the first intelligent endpoint, the location information of the first client; and
   means for automatically removing, by the first intelligent endpoint, the location information of the first client with the second client.

21. A method for distributing location information in an Internet Protocol (IP) network having a plurality of clients, wherein each client is associated with unique identification information, the method comprising:
   registering the unique identification information of each of the clients with a first intelligent endpoint;
   sending the unique identification information of each of the clients from the first Session Initiation Protocol (SIP) based intelligent endpoint to the other clients so that the clients can communicate directly;
   enabling at least a first one of the clients to become a second intelligent endpoint; and
   informing the other clients of the second intelligent endpoint if the first one of the clients becomes the second intelligent endpoint, wherein the first and second intelligent endpoints are networked computers that satisfy a predefined set of criteria to qualify as an intelligent endpoint for distributing location information from any client to any other client or another intelligent endpoint in the IP network, wherein the predefined set of criteria require that each intelligent endpoint have a static IP address and an always available IP connection.

22. The method of claim 21 further comprising determining whether the first one of the clients meets the predetermined set of criteria before enabling the first one of the clients to become the second intelligent endpoint.

23. The method of claim 21 further comprising associating each of the first and second intelligent endpoints with first and second areas of interest, respectively, and informing the clients of the first and second areas of interest.

24. The method of claim 23 further comprising:
   associating each client with at least one of the first and second areas of interest;
   registering the second intelligent endpoint with the first intelligent endpoint; and
   automatically registering any client that is registered with the first intelligent endpoint with the second intelligent endpoint if the client is associated with the second area of interest.

25. The method of claim 21 further comprising:
   enabling the first one of the clients to discontinue its role as the second intelligent endpoint; and
   informing the other clients that the first one of the clients is no longer the second intelligent endpoint.

26. A system for distributing location information in an Internet Protocol (IP) network having at least first and second clients, wherein each client is associated with unique identification information and able to become an intelligent endpoint, wherein an intelligent endpoint is a networked computer that satisfies a predefined set of criteria to qualify as an intelligent endpoint for distributing location information from any client to any other client or another intelligent endpoint in the IP network, wherein the predefined set of criteria require that each intelligent endpoint have a static IP address and an always available IP connection, the system comprising:
   a first Session Initiation Protocol (SIP) based intelligent endpoint accessible to the first and second clients and operable to provide the unique identification information of each client to the other client so that the clients can communicate directly; and
   the first and second clients, wherein either of the first and second clients can become a second intelligent endpoint, and wherein both the first and second intelligent endpoints can communicate with the first or second client that is not an endpoint.

27. The system of claim 26 further comprising:
   a processor associated with the first intelligent endpoint; and
   a memory accessible to the processor for storing instructions for processing by the processor, wherein the instructions comprise:
      registering the unique identification information of first and second clients;
      providing the unique identification information of each client to the other client; and
      registering the second intelligent endpoint if either of the first or second clients becomes the second intelligent endpoint.

28. The system of claim 27 further comprising instructions for, if the first or second client becomes the second intelligent endpoint, deregistering the unique identification information of the first or second client, respectively.

29. The system of claim 27 further comprising instructions for automatically informing the first client when the unique identification information of the second client is registered.

30. The system of claim 26 wherein the first and second intelligent endpoints are associated with static IP addresses.

31. A method for distributing location information in an Internet Protocol (IP) network having a plurality of clients and a Session Initiation Protocol (SIP) based intelligent endpoint, wherein each client is associated with unique identification information, and wherein the intelligent endpoint is a networked computer that satisfies a predefined set of criteria to qualify as an intelligent endpoint for distributing location information from any client to any other client or another intelligent endpoint in the IP network, wherein the predefined set of criteria require that each intelligent endpoint have a static IP address and an always available IP connection, and wherein any client can become an intelligent endpoint by satisfying the criteria and any intelligent endpoint can revert to a client, the method comprising:
   registering each of the plurality of clients with the intelligent endpoint when each client logs on to the network;
   sending the unique identification information of each registered client to the other registered clients;
   accepting a change in status of any of the plurality of clients from a client status to an intelligent endpoint status; and
   notifying the plurality of clients of the change in status.

32. The method of claim 31 further comprising verifying that any of the plurality of clients wanting to change from a client status to an intelligent endpoint status satisfies a predetermined set of parameters before accepting the change in status.

33. The system of claim 26 wherein any client can become an intelligent endpoint by satisfying the criteria and any intelligent endpoint can revert to a client.

* * * * *